United States Patent
Barkley (10) Patent No.: US 9,834,017 B2
(45) Date of Patent: Dec. 5, 2017

(54) INKJET PRINTER

(71) Applicant: FUNAI ELECTRIC CO., LTD., Daito-shi, Osaka (JP)

(72) Inventor: Lucas D. Barkley, Lexington, KY (US)

(73) Assignee: Funai Electric Co. Ltd., Osaka (JP)

( * ) Notice: Subject to any disclaimer, the term of this patent is extended or adjusted under 35 U.S.C. 154(b) by 0 days.

(21) Appl. No.: 14/947,373

(22) Filed: Nov. 20, 2015

(65) Prior Publication Data

US 2017/0144461 A1   May 25, 2017

(51) Int. Cl.
*B41J 25/00* (2006.01)

(52) U.S. Cl.
CPC ............................. *B41J 25/001* (2013.01)

(58) Field of Classification Search
CPC ........ B41J 2/205; B41J 2/2052; B41J 2/2054; B41J 2/2056; B41J 2/2132; B41J 2/2121; B41J 2002/2058
See application file for complete search history.

(56) References Cited

U.S. PATENT DOCUMENTS

| | | | |
|---|---|---|---|
| 6,145,959 A | 11/2000 | Lund et al. | |
| 6,375,307 B1 * | 4/2002 | Vinals ................. | G06K 15/105 347/16 |
| 7,682,017 B2 | 3/2010 | Reed et al. | |
| 8,152,262 B2 | 4/2012 | Seccombe | |
| 2006/0092198 A1* | 5/2006 | Conca ..................... | B41J 3/543 347/9 |
| 2007/0263063 A1* | 11/2007 | Reed ..................... | B41J 2/2132 347/109 |
| 2009/0315932 A1* | 12/2009 | Dimitrijevic ........ | G06K 15/107 347/12 |
| 2011/0273729 A1* | 11/2011 | Tanase ..................... | B41J 2/155 358/1.8 |
| 2014/0028748 A1 | 1/2014 | Hudd et al. | |

FOREIGN PATENT DOCUMENTS

WO       2012023411 A1   2/2012

* cited by examiner

*Primary Examiner* — Geoffrey Mruk
*Assistant Examiner* — Scott A Richmond
(74) *Attorney, Agent, or Firm* — Amster, Rothstein & Ebenstein, LLP (57) ABSTRACT

A method of controlling an inkjet printer including the steps of reciprocating the printhead repeatedly across the print medium in a plurality of passes, repeatedly firing the nozzles during each printhead pass so that each pass results in printing of a print swath across the print medium, alternately disabling upper and lower portions of the one or more nozzle arrays from swath to swath so that the swaths are reduced in height and for each reduced-height swath, reducing print density at the leading and trailing edge portions of the reduced-height swath as compared to print density at a central portion of the reduced-height swath.

6 Claims, 10 Drawing Sheets

INKJET PRINTER

FIELD

This invention is related to inkjet printheads and in particular to methods of improving print quality.

BACKGROUND

Conventional inkjet printing requires cyclical deposition of swaths between substrate moves. The area of the interface of each swath, called a swath boundary, may contain defects due to many different error sources and process variables. Examples of swath boundary error sources are: substrate motion error, print head motion error, print head alignment, ink droplet formation variation, ink dry-time, ink colorant order, just to name a few.

One method commonly used to reduce sensitivity to substrate motion error is swath edge tapering. This refers to reducing the density of the swath some number of nozzles away from the end, then adjusting the move sizes so that the complimentary density can be deposited by the opposite end of the print head after the appropriate substrate motion. A common side effect of utilizing swath edge tapering is that it can introduce new defects due to ink colorant order, ink dry-time, etc.

SUMMARY OF THE INVENTION

An object of the present invention is to reduce the effects of ink colorant order and dry-time inside an edge taper. This is achieved by strategically placing each taper region with respect to the previous swaths.

According to an exemplary embodiment of the present invention, an inkjet printer that applies an ink pattern to a print medium comprises: a printhead comprising nozzles arranged in one or more nozzle arrays; and a controller configured to operate the printhead to perform a method comprising: reciprocating the printhead repeatedly across the print medium in a plurality of passes; repeatedly firing the nozzles during each printhead pass so that each pass results in printing of a print swath across the print medium; alternately disabling upper and lower portions of the one or more nozzle arrays from swath to swath so that the swaths are reduced in height; and for each reduced-height swath, reducing print density at the leading and trailing edge portions of the reduced-height swath as compared to print density at a central portion of the reduced-height swath.

In an exemplary embodiment, two or more of the plurality of swaths overlap one another to form respective rows of an ink pattern.

In an exemplary embodiment, within each row, the reduced print density leading edge portion of each reduced-height swath does not extend beyond the central portion of an immediately previous reduced-height swath.

In an exemplary embodiment, the print density at the central portion of the reduced-height swath is 100%.

In an exemplary embodiment, the print density at the leading and trailing edge portions of the reduced-height swaths are tapered downwards from the central portion.

Other features and advantages of embodiments of the invention will become readily apparent from the following detailed description, the accompanying drawings and the appended claims.

BRIEF DESCRIPTION OF THE DRAWINGS

The features and advantages of exemplary embodiments of the present invention will be more fully understood with reference to the following, detailed description when taken in conjunction with the accompanying figures, wherein.

DETAILED DESCRIPTION

The headings used herein are for organizational purposes only and are not meant to be used to limit the scope of the description or the claims. As used throughout this application, the words "may" and "can" are used in a permissive sense (i.e., meaning having the potential to), rather than the mandatory sense (i.e., meaning must). Similarly, the words "include," "including," and "includes" mean including but not limited to. To facilitate understanding, like reference numerals have been used, where possible, to designate like elements common to the figures.

Figure 1:
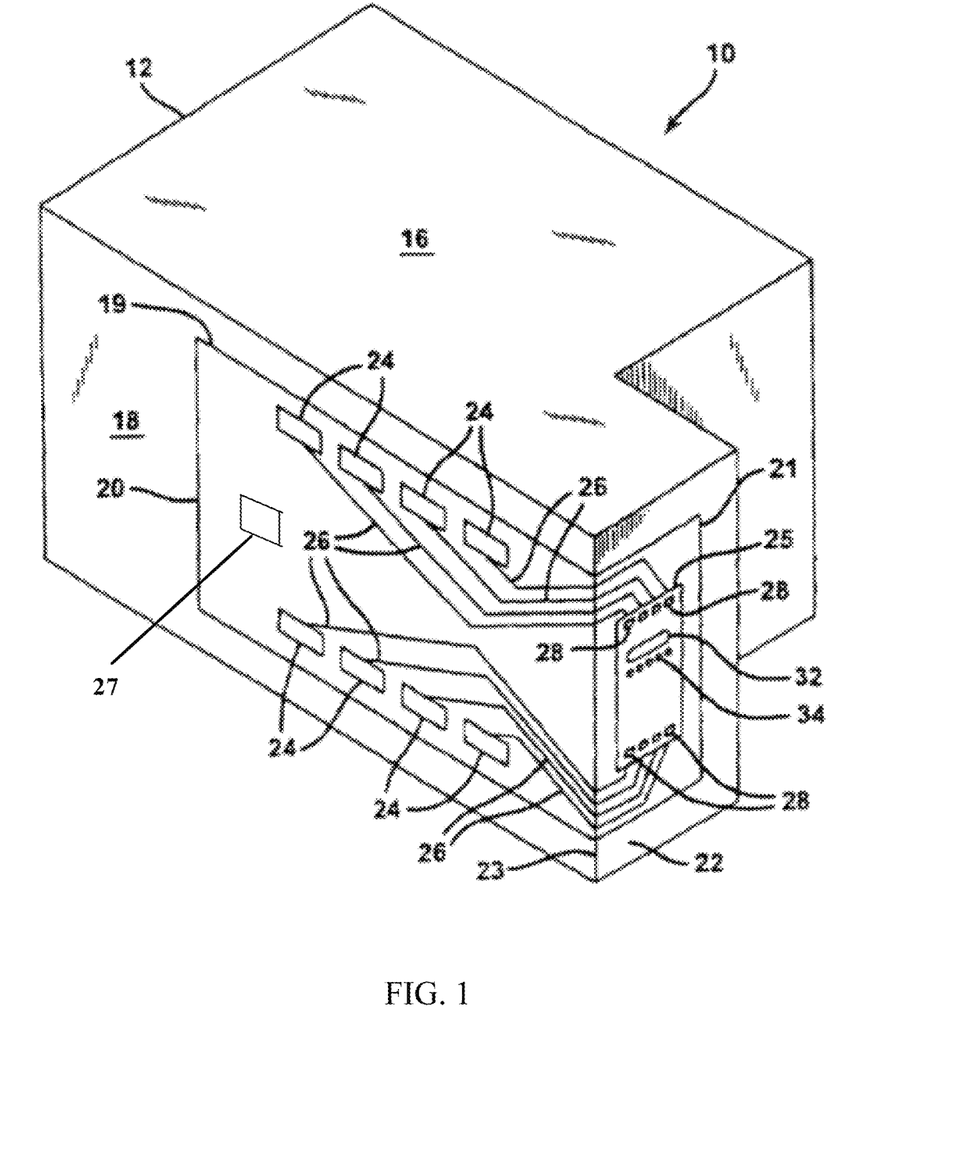
FIG. 1 is a perspective view of an inkjet printhead according to an exemplary embodiment of the present invention.

With reference to FIG. 1, an inkjet printhead according to an exemplary embodiment of the present invention is shown generally as 10. The printhead 10 has a housing 12 formed of any suitable material for holding ink. Its shape can vary and often depends upon the external device that carries or contains the printhead. The housing has at least one compartment 16 internal thereto for holding an initial or refillable supply of ink. In one embodiment, the compartment has a single chamber and holds a supply of black ink, photo ink, cyan ink, magenta ink or yellow ink. In other embodiments, the compartment has multiple chambers each containing separate supplies of ink. Preferably, it includes cyan, magenta and yellow ink. In still other embodiments, the compartment contains plurals of black, photo, cyan, magenta or yellow ink. It will be appreciated, however, that while the compartment 16 is shown as locally integrated within a housing 12 of the printhead, it may alternatively connect to a remote source of ink and receive supply from a tube, for example.

Adhered to one surface 18 of the housing 12 is a portion 19 of a flexible circuit, especially a tape automated bond (TAB) circuit 20. The other portion 21 of the TAB circuit 20 is adhered to another surface 22 of the housing. In this embodiment, the two surfaces 18, 22 are perpendicularly arranged to one another about an edge 23 of the housing.

The TAB circuit 20 supports a plurality of input/output (I/O) connectors 24 thereon for electrically connecting a heater chip 25 to an external device, such as a printer, fax machine, copier, photo-printer, plotter, all-in-one, etc., during use. Pluralities of electrical conductors 26 exist on the TAB circuit 20 to electrically connect and short the I/O connectors 24 to the input terminals (bond pads 28) of the heater chip 25. Those skilled in the art know various techniques for facilitating such connections. For simplicity, FIG. 1 only shows eight I/O connectors 24, eight electrical conductors 26 and eight bond pads 28 but present day printheads have much larger quantities and any number is equally embraced herein. Still further, those skilled in the art should appreciate that while such number of connectors, conductors and bond pads equal one another, actual printheads may have unequal numbers.

The heater chip 25 contains a column 34 of a plurality of fluid firing elements that serve to eject ink from compartment 16 during use. The fluid firing elements may embody thermally resistive heater elements (heaters for short) formed as thin film layers on a silicon substrate or piezoelectric elements despite the thermal technology implication derived from the name heater chip. For simplicity, the pluralities of fluid firing elements in column 34 are shown adjacent an ink via 32 as a row of five dots but in practice may include several hundred or thousand fluid firing elements. As described below, vertically adjacent ones of the fluid firing elements may or may not have a lateral spacing gap or stagger there between. In general, the fluid firing elements have vertical pitch spacing comparable to the dots-per-inch resolution of an attendant printer. Some examples include spacing of $\frac{1}{300}$th, $\frac{1}{600}$th, $\frac{1}{1200}$th, $\frac{1}{2400}$th or other of an inch along the longitudinal extent of the via. To form the vias, many processes are known that cut or etch the via 32 through a thickness of the heater chip. Some of the more preferred processes include grit blasting or etching, such as wet, dry, reactive-ion-etching, deep reactive-ion-etching, or other. A nozzle plate (not shown) has orifices thereof aligned with each of the heaters to eject the ink during use. The nozzle plate may attach with an adhesive or epoxy or may be fabricated as a thin-film layer.

A memory unit 27 stores data related to information such as, for example, the production date, the lifetime and the number of refilled times that can be made.

Figure 2:
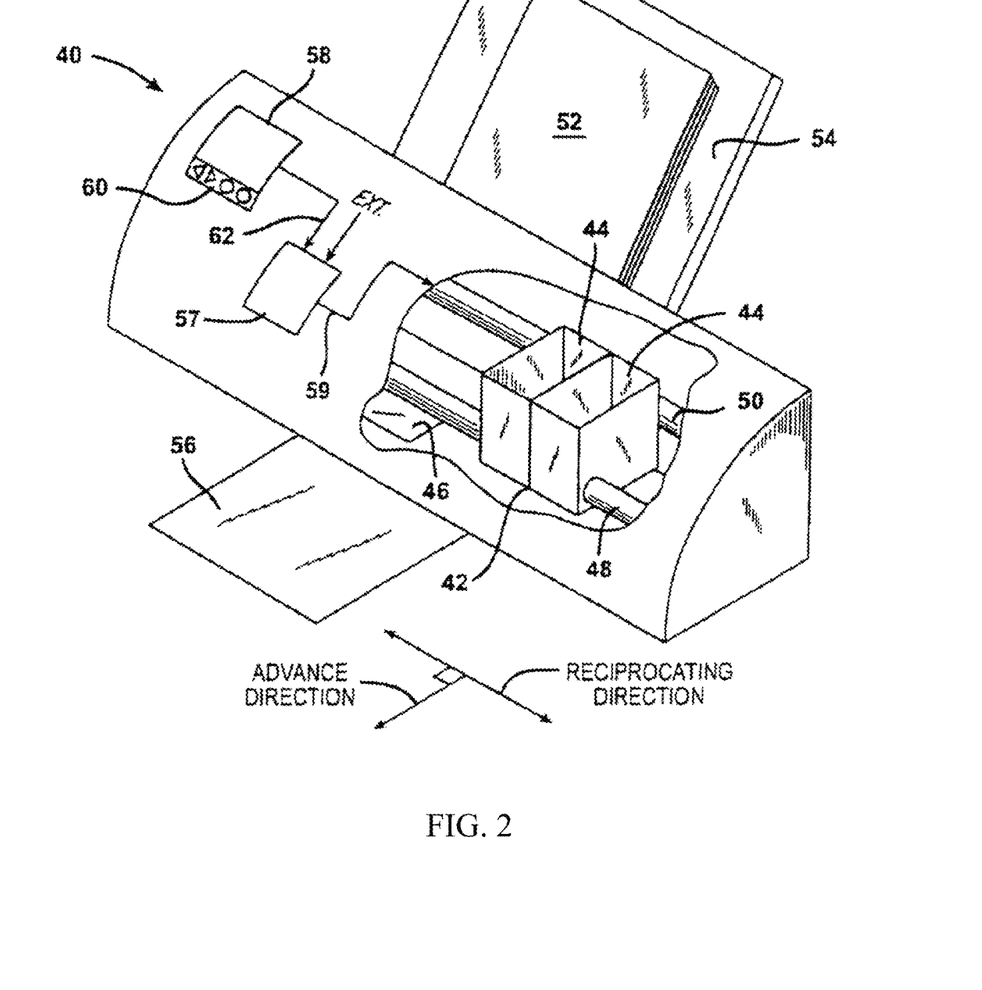
FIG. 2 is a perspective view of an inkjet printer according to an exemplary embodiment of the present invention.

With reference to FIG. 2, an external device in the form of an inkjet printer for containing the printhead 10 is shown generally as 40. The printer 40 includes a carriage 42 having a plurality of slots 44 for containing one or more printheads 10. The carriage 42 reciprocates (in accordance with an output 59 of a controller 57) along a shaft 48 above a print zone 46 by a motive force supplied to a drive belt 50 as is well known in the art. The reciprocation of the carriage 42 occurs relative to a print medium, such as a sheet of paper 52 that advances in the printer 40 along a paper path from an input tray 54, through the print zone 46, to an output tray 56.

While in the print zone, the carriage 42 reciprocates in the Reciprocating Direction generally perpendicularly to the paper 52 being advanced in the Advance Direction as shown by the arrows. Ink drops from compartment 16 (FIG. 1) are caused to be eject from the heater chip 25 at such times pursuant to commands of a printer microprocessor or other controller 57. The timing of the ink drop emissions corresponds to a pattern of pixels of the image being printed. Often times, such patterns become generated in devices electrically connected to the controller 57 (via Ext. input) that reside externally to the printer and include, but are not limited to, a computer, a scanner, a camera, a visual display unit, a personal data assistant, or other.

To print or emit a single drop of ink, the fluid firing elements (the dots of column 34, FIG. 1) are uniquely addressed with a small amount of current to rapidly heat a small volume of ink. This causes the ink to vaporize in a local ink chamber between the heater and the nozzle plate and eject through, and become projected by, the nozzle plate towards the print medium. The fire pulse required to emit such ink drop may embody a single or a split firing pulse and is received at the heater chip on an input terminal (e.g., bond pad 28) from connections between the bond pad 28, the electrical conductors 26, the I/O connectors 24 and controller 57. Internal heater chip wiring conveys the fire pulse from the input terminal to one or many of the fluid firing elements.

A control panel 58, having user selection interface 60, also accompanies many printers as an input 62 to the controller 57 to provide additional printer capabilities and robustness.

Figure 3:
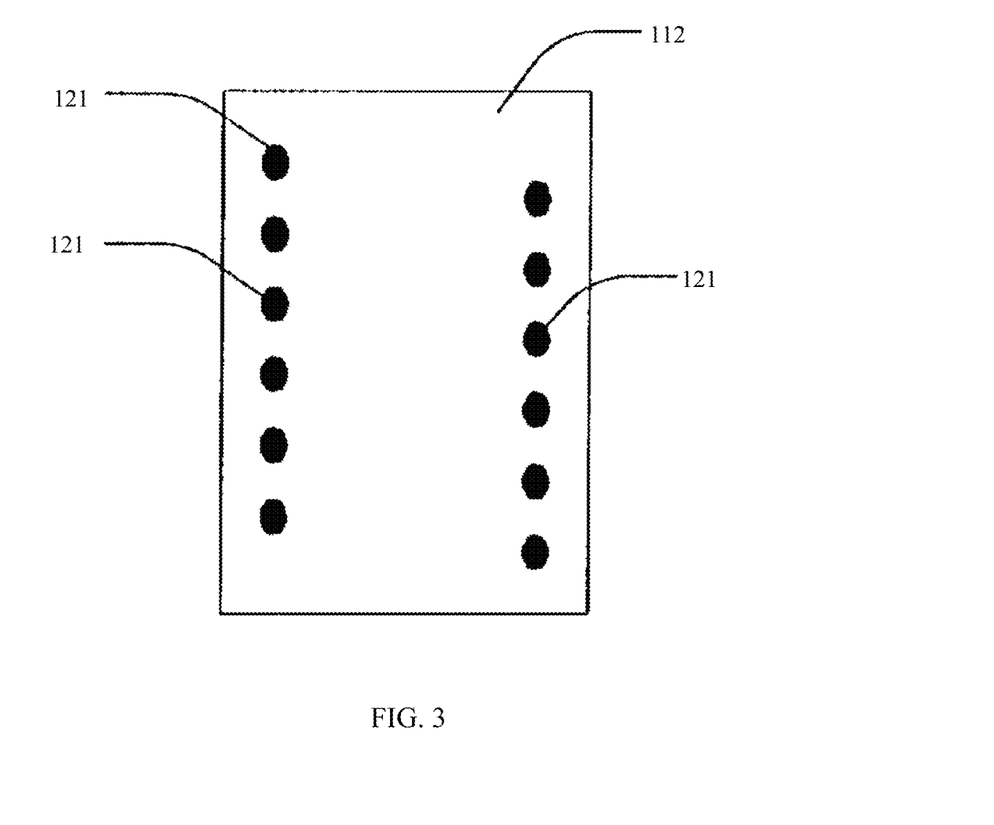
FIG. 3 is a layout view of an inkjet printhead according to an exemplary embodiment of the present invention.

FIG. 3 shows an exemplary layout of nozzles 121 in one example of a printhead 112. Printhead 112 has one or more laterally spaced nozzle or dot columns (i.e., nozzle arrays). Each nozzle 121 is positioned at a different vertical position (where the vertical direction is the direction of print medium travel, at a right angle to the direction of printhead travel), and corresponds to a respective pixel row on the underlying print medium. In some swaths of the printhead, all nozzles are used resulting in a full-height swath.

Many different printhead configurations are of course possible, and the invention is not limited to the simplified example shown in FIG. 3. Also, some printheads use redundant columns of nozzles for various purposes. Furthermore, color printers typically have three or more sets of nozzles positioned to apply ink droplets of different colors on the same pixel rows. The sets of nozzles might be contained within a single printhead, or incorporated in three different printheads. The principles of the invention described herein apply in either case.

Generally, printhead 112 is responsive to the control logic implemented by a microprocessor and memory to pass repeatedly across a print medium in individual, horizontal swaths. The individual nozzles of the printhead are fired repeatedly during each printhead swath to apply an ink pattern to the print medium. In some printers, the swaths overlap each other so that the printhead passes over each pixel row two or more times.

Figure 4:
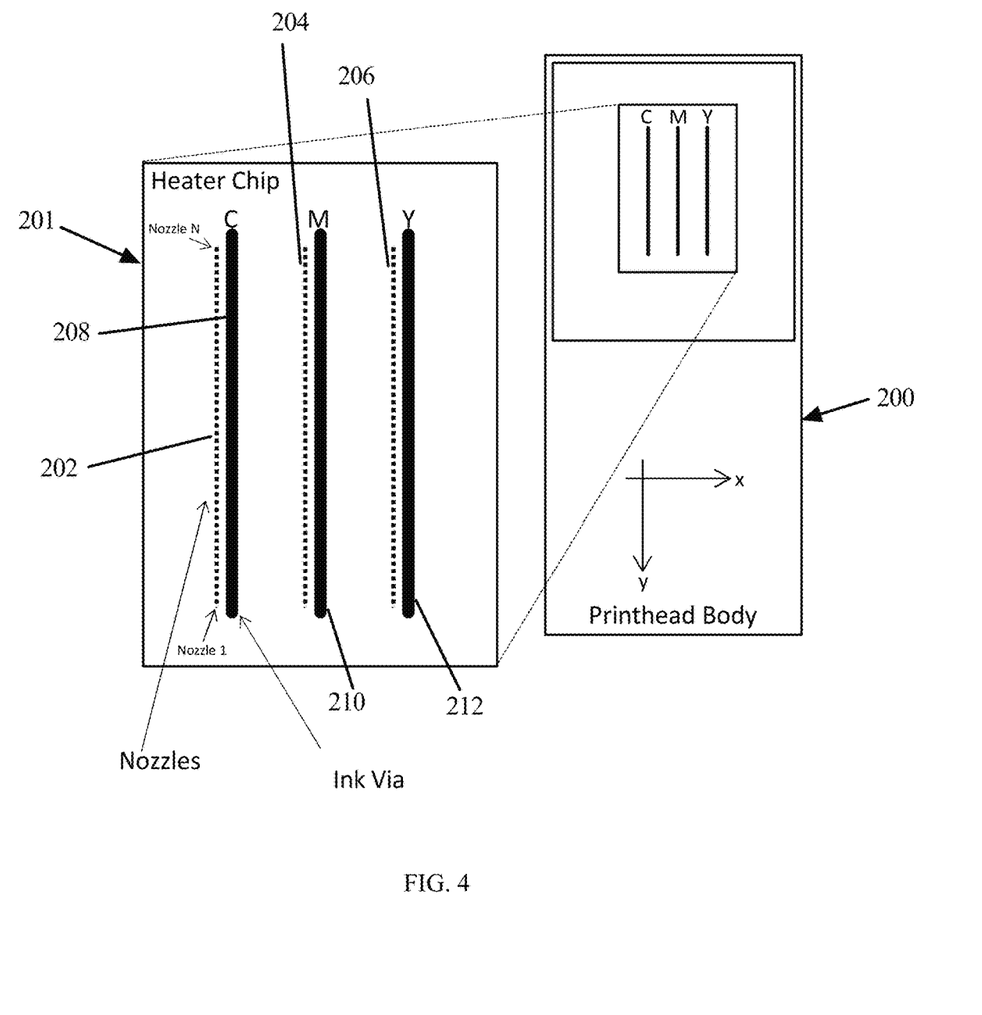
FIG. 4 is a bottom plan view of an inkjet printhead according to an exemplary embodiment of the present invention.
Figure 5:
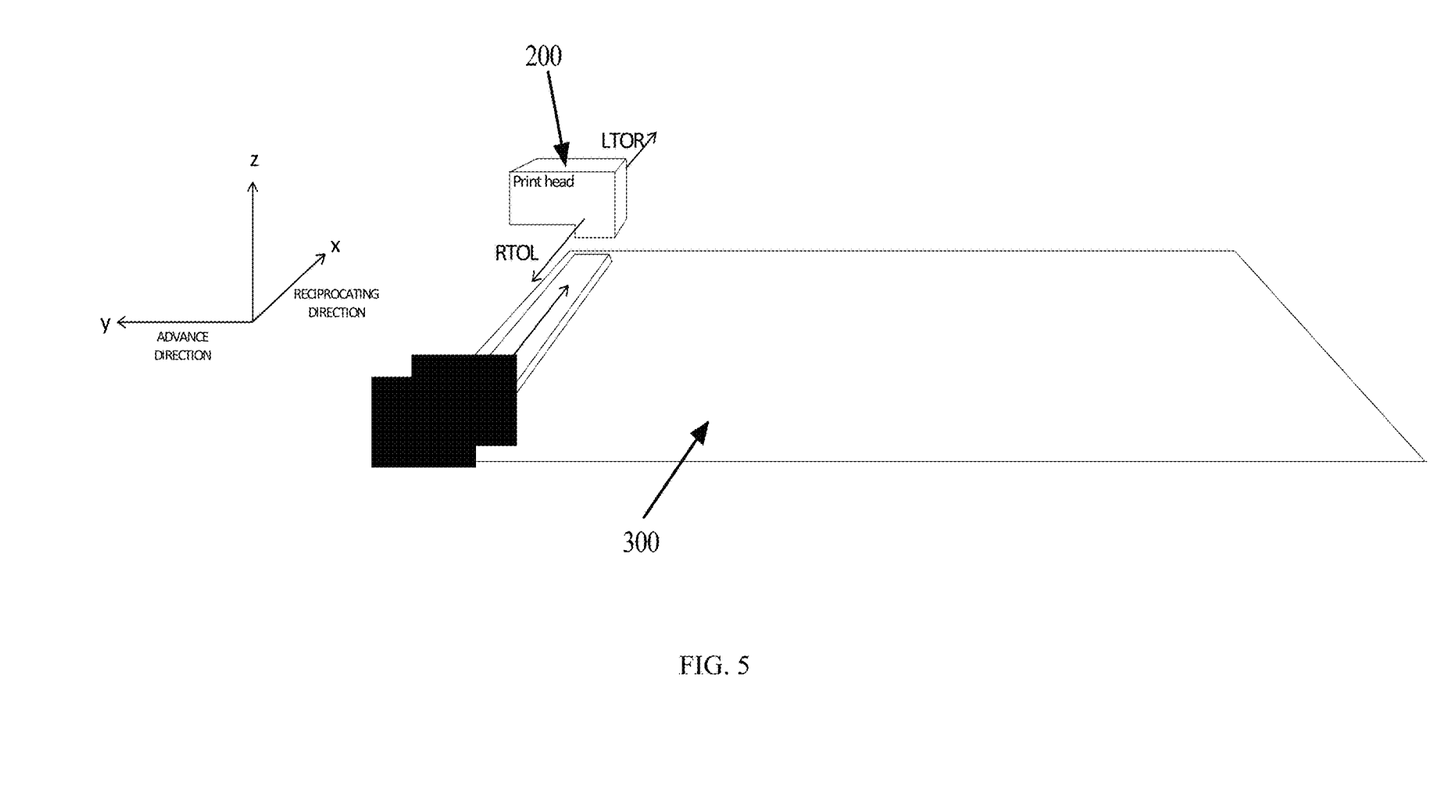
FIG. 5 is a perspective view showing movement of an inkjet printhead across a print medium according to an exemplary embodiment of the present invention.

FIG. 4 is a representative diagram of a printhead, generally designated by reference number 200, according to an exemplary embodiment of the present invention. The printhead includes a heater chip 201 in which are formed nozzle arrays 202, 204 and 206. Ink vias 208, 210 and 212 are provided to supply ink to the nozzle arrays 202, 204, 206, respectively. The ink vias 208, 210, 212 supply ink of different colors, so that each of the nozzle arrays 202, 204, 206 eject a different colored ink. For example, ink via 208 supplies cyan ink, ink via 210 supplies magenta ink and ink via 212 supplies yellow ink. For the purposes of the present invention, the X-direction corresponds to the direction in which the printhead 200 moves laterally across the print medium to print swaths of colored ink, and the Y-direction corresponds to the direction of relative movement between the print medium and the printhead 200 between swaths (i.e., the advance direction). As shown in FIG. 4, the nozzle arrays 202, 204, 206 extend in the Y-direction, and the printhead 200 moves laterally relative to the print medium in the X-direction. For further clarity, FIG. 5 is a three-dimensional diagram showing movement of the printhead 200 in the X-direction relative to a print medium 300 in a plurality of swaths. In exemplary embodiments, the print medium 300 and/or the printhead 200 may be moved in the Y-direction so that swaths may be printed in a sequential manner.

Figure 6A:
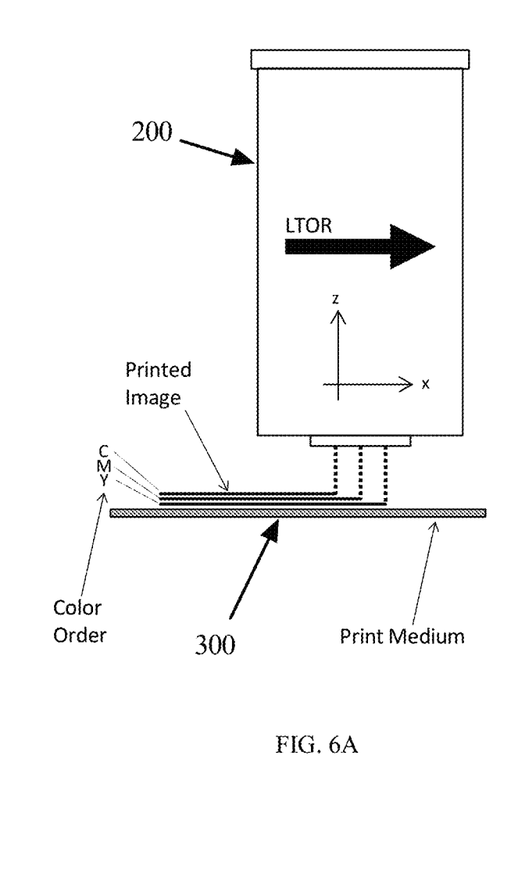
FIGS. 6A and 6B are side views showing ejection of ink from a printhead according to an exemplary embodiment of the present invention.
Figure 6B:
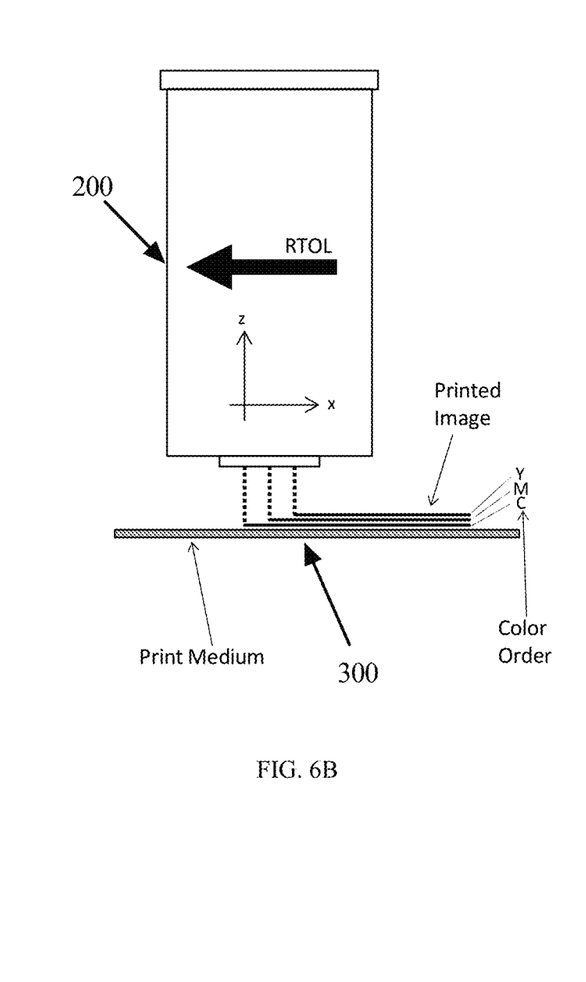

As the printhead 200 moves from left to right ("LTOR") and right to left ("RTOL") across the print medium, the nozzle arrays eject ink so that swaths of ink are printed. Specifically, as shown in FIGS. 6A and 6B, as the printhead 200 moves from left to right and from right to left across the print medium 300, the heater chip 201 is appropriately activated to eject ink from nozzle arrays 202, 204 and 206 so that cyan, magenta and yellow ink is printed onto the print medium 300 in an overlapping manner. Specifically, in a left to right swath, the magenta ink overlaps the yellow ink, and the cyan ink overlaps the magenta and yellow inks, and in a right to left swath, the magenta ink overlaps the cyan ink, and the yellow ink overlaps the magenta and cyan inks.

Figures 7A, 7B, 7C, 7D:
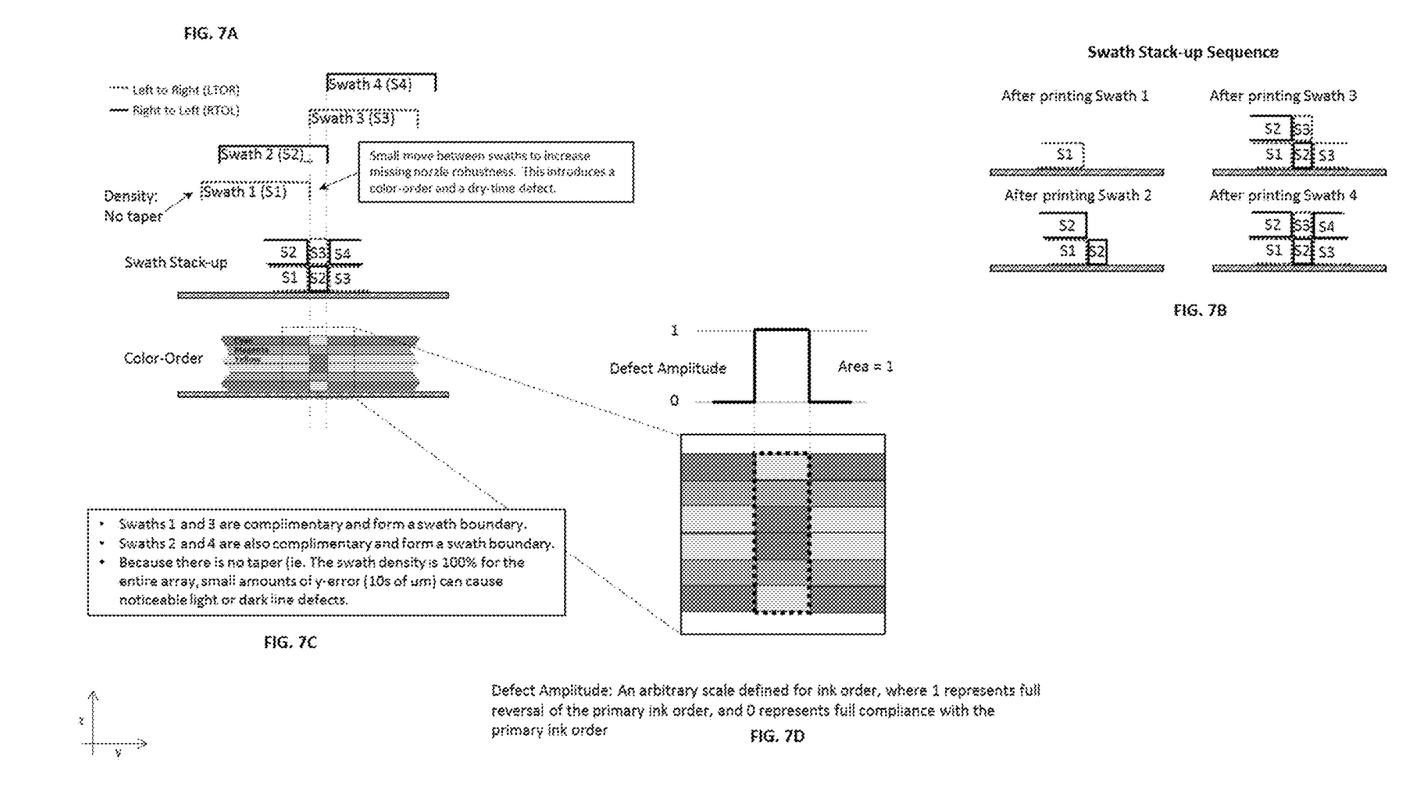
FIGS. 7A-7C show cross sections of print density across four swaths in sequence, how these swaths stack up at their boundary, and a depiction of the effective color order according to a conventional printing scheme with no edge taper.
FIG. 7D shows color order defects resulting from a conventional printing scheme with no edge taper.

FIG. 7A is a schematic representation of sequential print swaths on a print medium resulting from a printing scheme in which edge taper is not used to minimize color-order and dry-time defects. Each horizontal line in FIG. 7A represents variation of print density in the y-direction on a print medium (i.e., along the nozzle array) as the nozzle array prints a corresponding swath in the x-direction. As evident from FIG. 7A, the print density remains constant across the nozzle array as the printhead moves across the print medium for the entire swath. Assuming the printhead is in a two-pass mode, the printhead may alternate between a left-to-right scan and a right-to-left scan across the print medium. Swath 1 and Swath 3 are complimentary in that the leading edge of Swath 1 is aligned with the trailing edge of Swath 3. Similarly, Swath 2 and Swath 4 are complimentary in that the leading edge of Swath 2 is aligned with the trailing edge of Swath 4.

As shown by the horizontal displacement of the Swaths 1-4, the printhead or medium is moved a small amount between swaths 1 and 2 to increase missing nozzle robustness. This introduces color-order and dry-time defects. Because there is no taper (i.e., the swath density is 100% for the entire array), small amounts of y indexing-error can cause noticeable light or dark line defects. For example, FIG. 7B shows the swath stack up sequence and FIG. 7C shows the resulting swath stackup and color order. Portions on the print medium where the swaths of different color overlap (in this examples, Swaths 2 and 3) result in color-order defects in that the primary color order is reversed. In this regard, an arbitrary scale may be defined for ink order, where 1 represents full reversal of the primary ink order, and 0 represents full compliance with the primary ink order. Shown more clearly in FIG. 7D, because there is a complete color order reversal, the defect amplitude is at a maximum in the entire overlap region.

Figure 8:
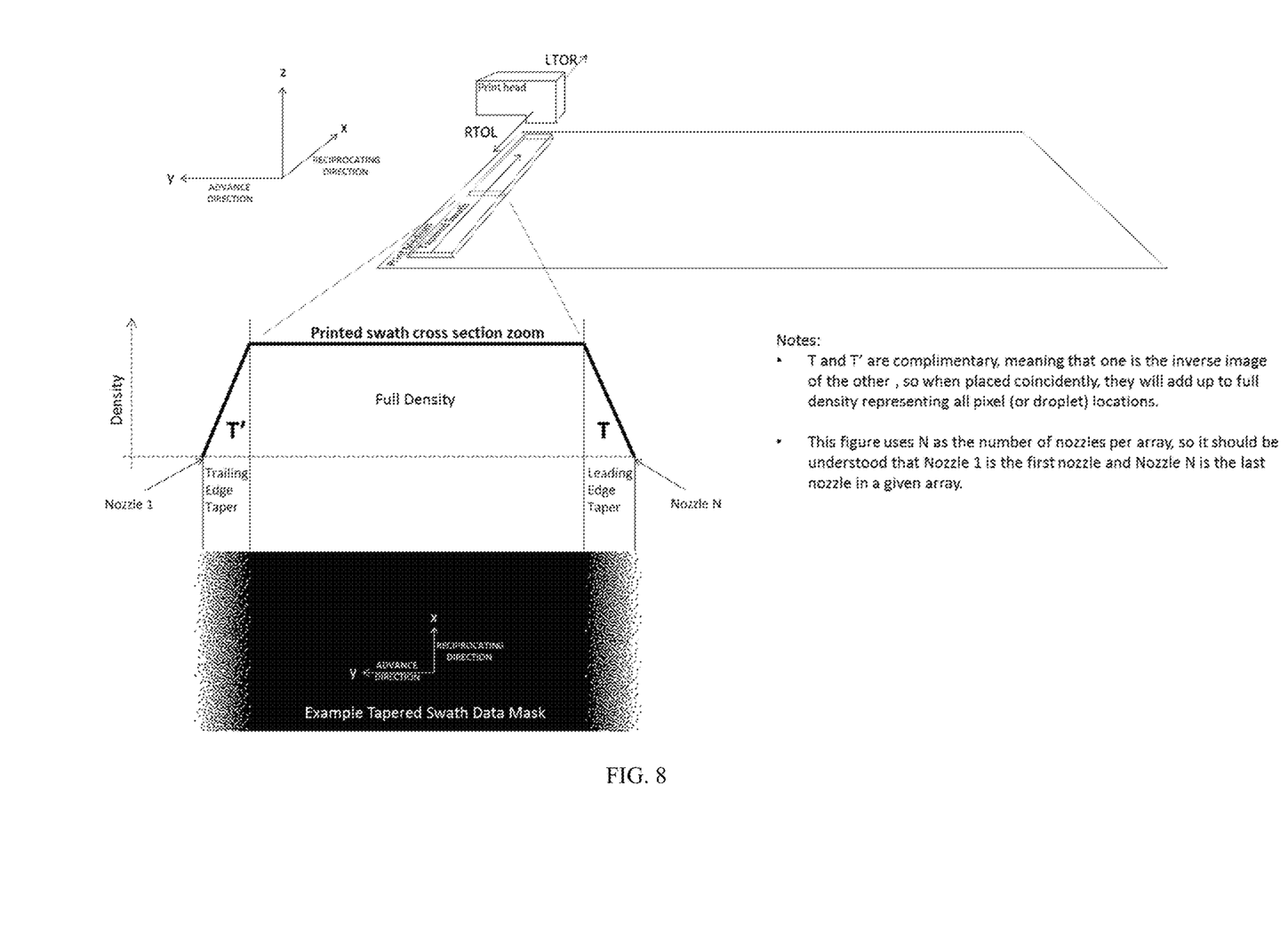
FIG. 8 is a perspective view showing movement of an inkjet printhead across a print medium and the resulting swaths having tapered edge print density according to a printing scheme with edge taper.

As shown in FIG. 8, in order to minimize color-order and dry-time defects, an edge taper may be used. Specifically, as the printhead 200 prints a swath in the X-direction, the print density of the nozzle array (i.e., the print density in the Y-direction from first nozzle 1 to last nozzle N) is tapered at the leading edge (T) and the trailing edge (T'). The leading edge (T) and the trailing edge (T') are complimentary in that one is the inverse image of the other, so that when they are placed coincidently, they will add up to full density representing all pixel (or droplet) locations.

Figures 9A, 9B, 9C, 9D:
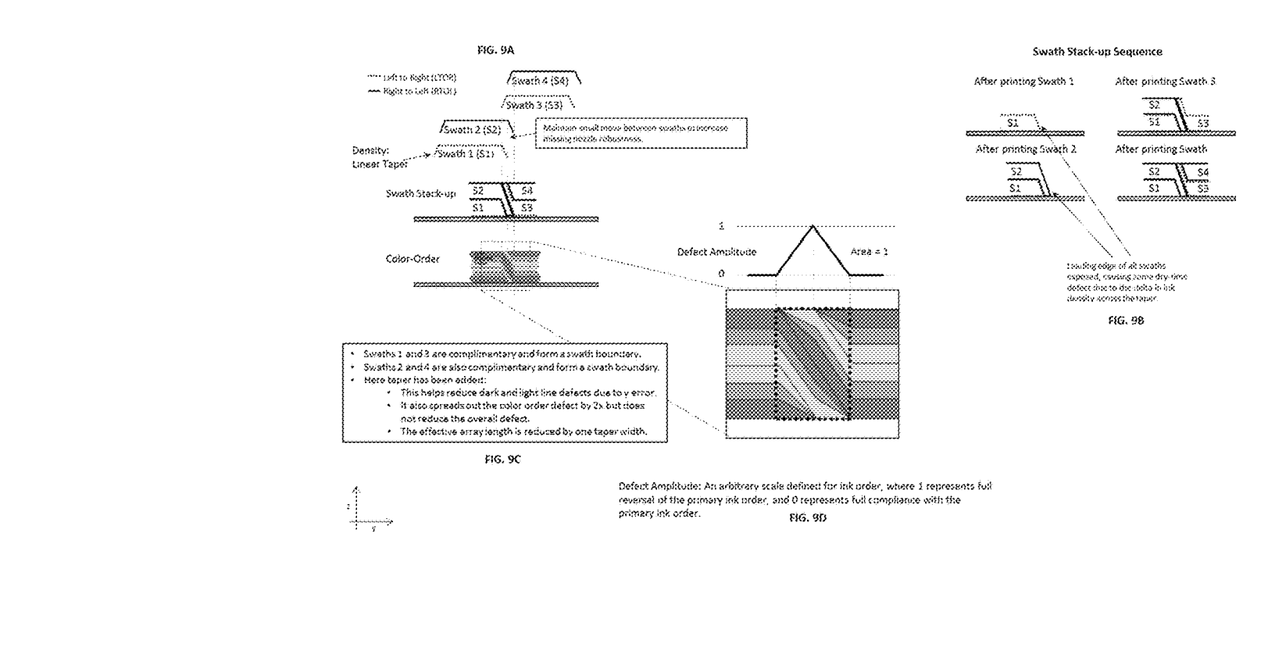
FIGS. 9A-9C show cross sections of print density across four swaths in sequence, how these swaths stack up at their boundary, and a depiction of the effective color order according to a conventional printing scheme with edge taper.
FIG. 9D shows color order defects resulting from a conventional printing scheme with edge taper.

FIG. 9A is a schematic representation of sequential print swaths on a print medium resulting from a printing scheme in which edge taper is used to minimize placement error. As explained previously, movement of the printhead or medium a small amount between swaths introduces color-order and dry-time defects. However, because there is a taper in print density at the edges of each swath (shown by the density profiles in FIG. 9A and the edges of the print swaths shown in FIG. 9B), dark and light line defects due to y-error are reduced. In this regard, FIG. 9B shows the swath stackup sequence and FIG. 9C shows the resulting swath stackup and color order. Portions on the print medium where the swaths of different color overlap result in color-order defects in that the primary color order is reversed, but as compared to a printing scheme in which edge taper is not used, the color order defect is spread out on the order of twice the amount. Shown more clearly in FIG. 9D, because there is a complete color order reversal only at the center of the overlap, the defect amplitude is not at a maximum through the entire overlap region.

Although the edge taper process reduces the color order defect, the defect is not completely eliminated. Further, the effective array length is reduced by one taper width and, since the leading edges of all swaths are exposed, some dry-time defects occur due to the delta in ink density across the taper.

In order to further minimize dry-time and color order defects, in an exemplary embodiment of the invention (shown in FIGS. 10A-10D), when implementing a 2-pass print mode and using a swath edge taper, the leading edge taper region of the second swath is placed over the full density portion of the first swath instead of on top of or beyond the first swath's leading edge taper. This does two things to improve dry-time banding: 1. It gives additional time for any drying gradient in the first swath's leading edge taper to reach equilibrium (i.e., finish drying) and, 2. It positions the second swath's leading edge taper in an area of constant density where there is no drying gradient. Next, the third swath is deposited such that its trailing edge taper fills in the compliment of the first swath's leading edge taper, which is now sufficiently dry. Finally, the fourth swath is deposited such that its trailing edge taper fills in the compliment of the second swath's leading edge taper which is now sufficiently dry. After this, the cycle continues until the image is completely printed.

Figures 10A, 10B, 10C, 10D:
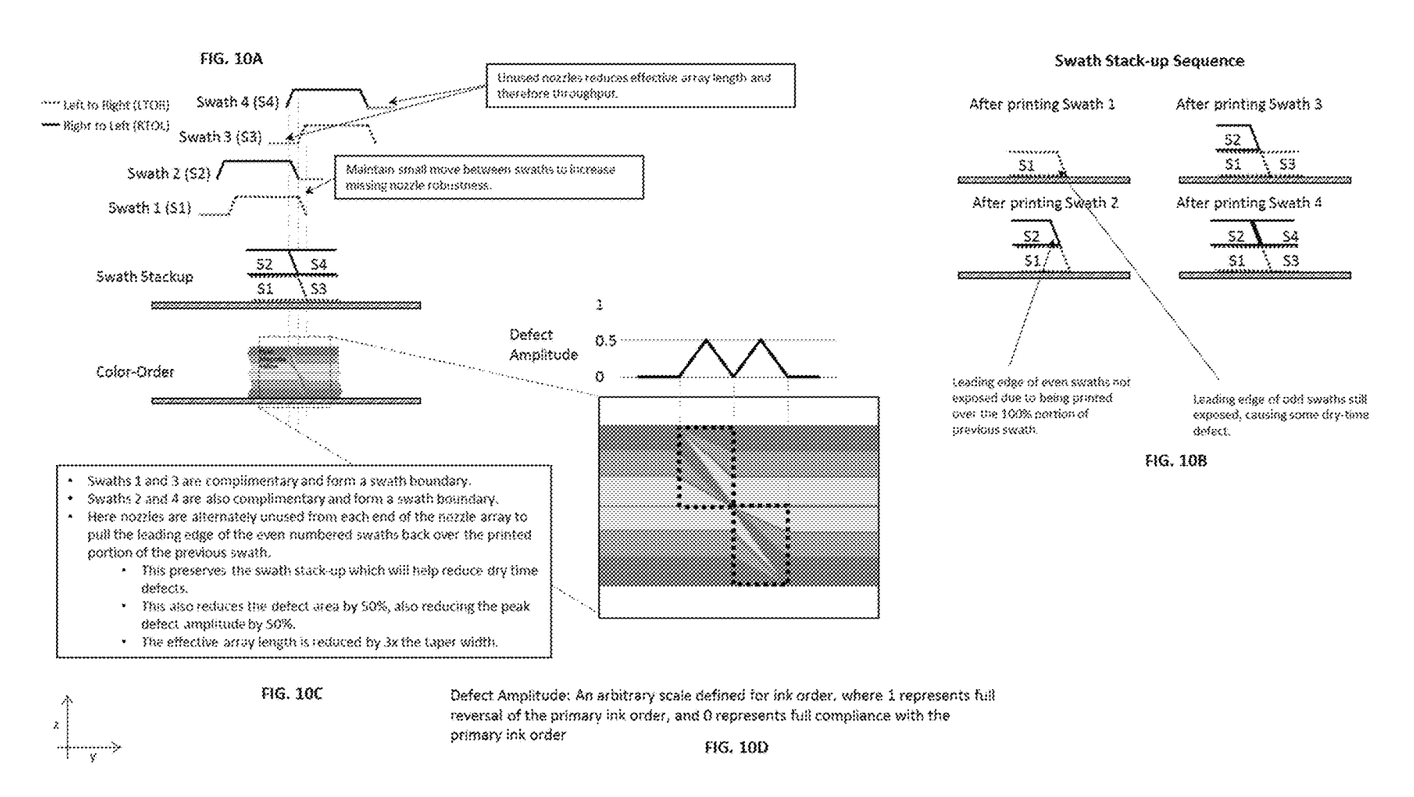
FIGS. 10A-10C show cross sections of print density across four swaths in sequence, how these swaths stack up at their boundary, and a depiction of the effective color order according to a printing scheme of an exemplary embodiment of the present invention.
FIG. 10D shows color order defects resulting from a printing scheme of an exemplary embodiment of the present invention.

FIG. 10A is a schematic representation of sequential print swaths on a print medium resulting from a printing scheme according to an exemplary embodiment of the present invention in which edge taper with underlap is used to minimize color-order and dry-time defects. Each horizontal line in FIG. 10A represents variation of the print density in the y-direction (i.e., along the nozzle array) on a print medium as the nozzle array prints a corresponding swath in the x-direction. As evident from FIG. 10A, the print density remains constant across the nozzle array except at the edges of the array, at which point the print density is gradually reduced in a tapered manner. Assuming the printhead is in a two-pass mode, the printhead may alternate between a left-to-right scan and a right-to-left scan across the print medium. Swath 1 and Swath 3 are complimentary in that the bottom edge portion of Swath 1 and the top edge portion of Swath 3 form a complete swath boundary (i.e., only part of the complete swath boundary is printed in each of the bottom edge portion of Swath 1 and the top edge of Swath 3), and Swath 2 and Swath 4 are complimentary in that the bottom edge portion of Swath 2 and the top edge portion of Swath 4 form a complete swath boundary (i.e., only part of the complete swath boundary is printed in each of the bottom edge portion of Swath 2 and the top edge of Swath 4).

The printhead or medium is moved a small amount between swaths to increase missing nozzle robustness. Again, this introduces small color-order and dry-time defects. However, because there is a taper in print density at the edges of each swath, dark and light line defects due to y-error are reduced. Further, nozzles are alternately unused from each end of the nozzle array. For example, nozzles at the trailing edge of the nozzle array may be left unused in odd-numbered print swaths, and nozzles at the leading edge of the nozzle array may be left unused in even-numbered print swaths. This results in the leading edge of the even numbered swaths being pulled back over the 100% density printed portion of the previous swath.

FIG. 10B shows the swath stackup sequence and FIG. 10C shows the resulting swath stackup and color order resulting from the taper printing scheme according to an exemplary embodiment of the present invention. Portions on the print medium where the swaths of different color overlap result in color-order defects in that the primary color order is reversed, but as compared to a printing scheme in which only edge taper is used, the color order defect is further reduced. Shown more clearly in FIG. 10D, due to the taper and overlap, the color order is never completely reversed as it is in printing schemes using only edge taper or no edge taper. Compared to using just taper, the color order defect area is reduced by 50%, so that the peak defect amplitude is also reduced by 50%.

While particular embodiments of the invention have been illustrated and described, it would be obvious to those skilled in the art that various other changes and modifications may be made without departing from the spirit and scope of the invention. It is therefore intended to cover in the appended claims all such changes and modifications that are within the scope of this invention.

What is claimed is:

1. An inkjet printer that applies an ink pattern to a print medium, the inkjet printer comprising:
   a printhead comprising nozzles arranged in one or more nozzle arrays; and
   a controller that operates the printhead to perform a method comprising:
      reciprocating the printhead repeatedly across the print medium in a plurality of passes;
      repeatedly firing the nozzles during each printhead pass so that each pass results in printing of a print swath across the print medium;
      alternately disabling upper and lower portions of the one or more nozzle arrays from swath to swath so that the swaths are reduced in height; and
      for each reduced-height swath, reducing print density at the leading and trailing edge portions of the reduced-height swath as compared to print density at a central portion of the reduced-height swath,
      wherein the reduced print density leading edge portion of at least one of the reduced-height swaths is printed over the central portion of another of the reduced-height swaths.

2. The inkjet printer of claim 1, wherein two or more of the plurality of swaths overlap one another to form respective rows of an ink pattern.

3. The inkjet printer of claim 2, wherein, within each row, the reduced print density leading edge portion of each reduced-height swath does not extend beyond the central portion of an immediately previous reduced-height swath.

4. The inkjet printer of claim 1, wherein the print density at the central portion of the reduced-height swath is 100%.

5. The inkjet printer of claim 1, wherein the print density at the leading and trailing edge portions of the reduced-height swaths are tapered downwards from the central portion.

6. The inkjet printer of claim 1, wherein the reduced print density leading edge portion of at least one of the reduced-height swaths overlaps the central portion of a corresponding previous one of the reduced-height swaths.

* * * * *